United States Patent
Honda et al.

(10) Patent No.: US 11,777,175 B2
(45) Date of Patent: Oct. 3, 2023

(54) SEPARATOR FOR NON-AQUEOUS SECONDARY BATTERY, NON-AQUEOUS SECONDARY BATTERY, AND METHOD OF MANUFACTURING NON-AQUEOUS SECONDARY BATTERY

(71) Applicant: TEIJIN LIMITED, Osaka (JP)

(72) Inventors: Susumu Honda, Osaka (JP); Satoshi Nishikawa, Osaka (JP); Takashi Yoshitomi, Osaka (JP); Tomoya Hamada, Osaka (JP); Yoshimitsu Takano, Osaka (JP)

(73) Assignee: TEIJIN LIMITED, Osaka (JP)

( * ) Notice: Subject to any disclaimer, the term of this patent is extended or adjusted under 35 U.S.C. 154(b) by 325 days.

(21) Appl. No.: 15/738,809

(22) PCT Filed: Jun. 30, 2016

(86) PCT No.: PCT/JP2016/069552
§ 371 (c)(1),
(2) Date: Dec. 21, 2017

(87) PCT Pub. No.: WO2017/002947
PCT Pub. Date: Jan. 5, 2017

(65) Prior Publication Data
US 2018/0190957 A1    Jul. 5, 2018

(30) Foreign Application Priority Data

Jul. 2, 2015  (JP) .................. 2015-133546

(51) Int. Cl.
| H01M 50/44 | (2021.01) |
| H01M 10/0587 | (2010.01) |
| B32B 5/22 | (2006.01) |
| B32B 27/20 | (2006.01) |
| H01M 10/04 | (2006.01) |
| H01M 50/457 | (2021.01) |
| H01M 50/451 | (2021.01) |
| H01M 50/489 | (2021.01) |
| H01M 10/0525 | (2010.01) |
| H01M 50/491 | (2021.01) |
| B32B 27/30 | (2006.01) |
| H01M 50/417 | (2021.01) |
| H01M 10/0566 | (2010.01) |
| H01M 50/403 | (2021.01) |

(52) U.S. Cl.
CPC .............. *H01M 50/44* (2021.01); *B32B 5/22* (2013.01); *B32B 27/20* (2013.01); *B32B 27/30* (2013.01); *H01M 10/0431* (2013.01); *H01M 10/0525* (2013.01); *H01M 10/0587* (2013.01); *H01M 50/417* (2021.01); *H01M 50/451* (2021.01); *H01M 50/457* (2021.01); *H01M 50/489* (2021.01); *H01M 10/0566* (2013.01); *H01M 50/403* (2021.01); *H01M 50/491* (2021.01); *H01M 2220/30* (2013.01)

(58) Field of Classification Search
None
See application file for complete search history.

(56) References Cited

U.S. PATENT DOCUMENTS

| 6,413,676 | B1 * | 7/2002 | Munshi | H01M 4/667 429/316 |
| 2010/0099022 | A1 * | 4/2010 | Nishida | H01M 50/581 429/144 |
| 2010/0316903 | A1 * | 12/2010 | Kim | H01M 50/449 429/144 |
| 2012/0015232 | A1 * | 1/2012 | Teshima | H01M 4/1395 429/145 |
| 2012/0268072 | A1 * | 10/2012 | Okuno | H01M 2/1686 320/128 |
| 2014/0248525 | A1 * | 9/2014 | Iwai | H01M 2/168 429/144 |
| 2014/0255754 | A1 * | 9/2014 | Nishikawa | H01M 2/027 429/145 |
| 2014/0272505 | A1 * | 9/2014 | Yoon | H01M 50/417 429/94 |

(Continued)

FOREIGN PATENT DOCUMENTS

| CN | 103891000 A | 6/2014 | |
| CN | 104600230 A | 5/2015 | |
| JP | 2006-120462 A | 5/2006 | |
| JP | 4127989 B2 | 7/2008 | |
| JP | 2012-074367 A | 4/2012 | |
| JP | WO2013058367 | * 4/2013 | .............. H01M 2/16 |
| JP | WO2013058370 | * 4/2013 | .............. H01M 2/16 |

(Continued)

OTHER PUBLICATIONS

Bibliographic data for WO2013058370 (2013).*

(Continued)

*Primary Examiner* — Anca Eoff
(74) *Attorney, Agent, or Firm* — Sughrue Mion, PLLC

(57) ABSTRACT

A separator includes a porous substrate, and a porous layer formed on one or both surfaces of the substrate and containing a polyvinylidene fluoride type resin and a filler, in which the filler content in the porous layer is from 30 to 80% by mass with respect to the total mass of the polyvinylidene fluoride type resin and the filler, and the polyvinylidene fluoride type resin is at least one resin selected from the following resin A and B:

resin A: a copolymer having a weight average molecular weight of from 100,000 to 350,000, and a content of HFP is more than 5% by mass but not more than 11% by mass; and resin B: a copolymer having a weight average molecular weight of from 100,000 to 1,000,000, in which a content of HFP is more than 11% by mass but not more than 15% by mass.

16 Claims, No Drawings

(56) References Cited

U.S. PATENT DOCUMENTS

| | | | | |
|---|---|---|---|---|
| 2015/0221917 A1* | 8/2015 | Sakamoto | ................ | C08J 7/042 |
| | | | | 429/249 |
| 2015/0236323 A1 | 8/2015 | Honda et al. | | |
| 2015/0303003 A1* | 10/2015 | Ha | ...................... | H01M 50/451 |
| | | | | 136/252 |
| 2016/0172678 A1* | 6/2016 | Oyama | .................. | H01G 11/52 |
| | | | | 525/60 |
| 2016/0254511 A1* | 9/2016 | Hatta | ................ | H01M 10/0525 |
| | | | | 307/10.1 |

FOREIGN PATENT DOCUMENTS

| | | | |
|---|---|---|---|
| JP | 2014-041818 A | | 3/2014 |
| KR | 10-2014-0114428 A | | 9/2014 |
| WO | 2013/058371 A1 | | 4/2013 |
| WO | 2014/021290 A1 | | 2/2014 |
| WO | 2014/021293 A1 | | 2/2014 |
| WO | WO2015/016283 | * | 2/2015 |

OTHER PUBLICATIONS

International Search Report for PCT/JP2016/069552 dated Aug. 16, 2016 [PCT/ISA210].

Communication dated Mar. 17, 2020, issued by the State Intellectual Property Office of People's Partial Republic of China in application No. 201680035983.X.

* cited by examiner

SEPARATOR FOR NON-AQUEOUS SECONDARY BATTERY, NON-AQUEOUS SECONDARY BATTERY, AND METHOD OF MANUFACTURING NON-AQUEOUS SECONDARY BATTERY

CROSS REFERENCE TO RELATED APPLICATIONS

This application is a National Stage of International Application No. PCT/JP2016/069552 filed Jun. 30, 2016 (claiming priority based on Japanese Patent Application No. 2015-133546 filed Jul. 2, 2015), the contents of which are incorporated herein by reference in their entirety.

TECHNICAL FIELD

The present disclosure relates to a separator for a non-aqueous secondary battery, a non-aqueous secondary battery, and a method of manufacturing a non-aqueous secondary battery.

BACKGROUND ART

A non-aqueous secondary battery represented by a lithium ion secondary battery has been widely used as a power source of a portable electronic apparatus such as a notebook computer, a mobile phone, a digital camera, or a camcorder.

In recent years, the simplification and light weight of an outer casing of the non-aqueous secondary battery have been provided according to the miniaturization and light weight of the portable electronic apparatus. Metal cans made of stainless steel, aluminum or the like have been developed as the outer casing. Furthermore, an aluminum laminated film pack has been developed in place of the metal can.

However, since the aluminum laminated film pack is soft, impact from the outside, or expansion and contraction of an electrode due to charge and discharge are apt to form a space between an electrode and a separator in a battery (soft pack battery) including the pack as an outer casing. As a result, the cycle life of the battery may be decreased.

In order to solve the above problem, techniques for improving adhesion between an electrode and a separator have been proposed. As one of such techniques, there is known a separator in which a porous layer containing a polyvinylidene fluoride type resin is formed on a polyolefin microporous membrane (for example, see Japanese Patent Publication (JP-B) No. 4127989, International Publication Nos. 2014/021293, 2013/058371 and 2014/021290, and Japanese Patent Application Laid-Open (JP-A) No. 2014-41818). In a case in which the separator and the electrode are subjected to heat pressing in a state where the separator is stacked on the electrode, the separator satisfactorily adheres to the electrode via the porous layer, so that the cycle life of the battery can be improved.

Meanwhile, a separator for improving the safety of a soft pack battery has been proposed according to increases in the density and capacity of the soft pack battery. For example, Japanese Patent Application Laid-Open (JP-A) Nos. 2006-120462 and 2012-74367 propose a separator in which a heat-resistant layer containing inorganic particles and a heat-resistant binder resin is formed on a polyolefin microporous membrane.

SUMMARY OF INVENTION

Technical Problem

However, an object of the separators disclosed in the above-mentioned JP-B No. 4127989, International Publication Nos. 2014/021293, 2013/058371 and 2014/021290, and JP-A No. 2014-41818 is to improve the adhesion between the separator and the electrode. The object of the separators is not to improve the safety of the battery. In order to improve the safety of the battery, it is required to further improve the thermal dimensional stability of the separator.

The separators disclosed in JP-A Nos. 2006-120462 and 2012-74367 have a heat-resistant layer containing inorganic particles in an outermost layer, so that the separators have excellent thermal dimensional stability. The separators are considered to improve the safety of the battery. However, the separators having a heat-resistant layer containing inorganic particles in an outermost layer may have insufficient adhesion to the electrode.

Accordingly, it is an object of an exemplary embodiment of the present invention to provide a separator for a non-aqueous secondary battery that has excellent adhesion to an electrode and thermal dimensional stability, a non-aqueous secondary battery using the same, and a method of manufacturing the non-aqueous secondary battery.

Solution to Problem

Specific means for solving the above problem include the following aspects.

1. A separator for a non-aqueous secondary battery, containing a porous substrate; and
a porous layer formed on one surface or both surfaces of the porous substrate and containing a polyvinylidene fluoride type resin and a filler, wherein a content of the filler in the porous layer is from 30% by mass to 80% by mass with respect to a total mass of the polyvinylidene fluoride type resin and the filler, and the polyvinylidene fluoride type resin is at least one resin selected from the group consisting of the following resin A and resin B:

resin A: a copolymer containing a vinylidene fluoride monomer unit and a hexafluoropropylene monomer unit and having a weight average molecular weight of from 100,000 to 350,000, wherein a content of the hexafluoropropylene monomer unit is more than 5% by mass but not more than 11% by mass with respect to all monomer units of resin A; and resin B: a copolymer containing a vinylidene fluoride monomer unit and a hexafluoropropylene monomer unit and having a weight average molecular weight of from 100,000 to 1,000,000, wherein a content of the hexafluoropropylene monomer unit is more than 11% by mass but not more than 15% by mass with respect to all monomer units of resin B.

2. The separator for a non-aqueous secondary battery according to the above 1, wherein a thermal shrinkage ratio in a machine direction of the separator when heat-treated at 135° C. for 30 minutes is 20%0 or less.

3. The separator for a non-aqueous secondary battery according to the above 1 or 2, wherein a mass per layer area of the porous layer is from 0.5 g/m$^2$ to 5.0 g/m$^2$.

4. The separator for a non-aqueous secondary battery according to any one of the above 1 to 3, wherein a content of the filler in the porous layer is from 50% by mass to 70% by mass with respect to the total mass of the polyvinylidene fluoride type resin and the filler.

5. A non-aqueous secondary battery, containing a positive electrode, a negative electrode, and the separator for a non-aqueous secondary battery according to any one of the above 1 to 4 disposed between the positive electrode and the negative electrode, wherein an electromotive force is obtained by doping and dedoping lithium.

6. A method of manufacturing a non-aqueous secondary battery containing a positive electrode, a negative electrode, and the separator for a non-aqueous secondary battery according to any one of the above 1 to 4 disposed between the positive electrode and the negative electrode, wherein an electromotive force is obtained by doping and dedoping lithium, the method including a process of disposing the separator for a non-aqueous secondary battery between the positive electrode and the negative electrode, and rolling the electrodes and the separator to form a stacked body; a process of subjecting the stacked body to a heat pressing treatment under a temperature condition of 60° C. or higher but lower than 100° C. to form a battery element; and a process of accommodating the battery element in an outer casing in a state in which the battery element is impregnated with an electrolyte solution.

Advantageous Effects of Invention

According to exemplary embodiments of the invention, a separator for a non-aqueous secondary battery that has excellent adhesion to an electrode and thermal dimensional stability, a non-aqueous secondary battery using the same, and a method of manufacturing the non-aqueous secondary battery, are provided.

DESCRIPTION OF EMBODIMENTS

Exemplary embodiments of the invention will be described below. These descriptions and Examples are illustrative of the invention and do not limit the scope of the invention.

In this specification, numerical ranges depicted with "from" and "to" represent ranges inclusive of the numbers that respectively appear at the left and right of "to" as the minimum value and the maximum value, respectively.

A "machine direction" herein means the longitudinal direction of a separator continuously produced by a separator manufacturing apparatus, and a "width direction" means a direction perpendicular to the machine direction of the separator. The "machine direction" is also referred to as a "MD direction", and the "width direction" is also referred to as a "TD direction".

The term "process" herein includes not only a separate process but also a process which cannot be clearly distinguished from other processes as long as the desired object of the process is achieved.

A copolymer containing a vinylidene fluoride monomer unit and a hexafluoropropylene monomer unit is appropriately referred to as a "VDF-HFP copolymer".

<Separator for Non-Aqueous Secondary Battery>

A separator for a non-aqueous secondary battery according to an exemplary embodiment of the invention (hereinafter also simply referred to as a "separator") contains a porous substrate, and a porous layer formed on one surface or both surfaces of the porous substrate and containing a polyvinylidene fluoride type resin and a filler, wherein a content of the filler in the porous layer is from 30% by mass to 80% by mass with respect to a total mass of the polyvinylidene fluoride type resin and the filler, and the polyvinylidene fluoride type resin is at least one resin selected from the group consisting of the following resin A and resin B:

resin A: a copolymer containing a vinylidene fluoride monomer unit and a hexafluoropropylene monomer unit and having a weight average molecular weight of from 100,000 to 350,000, wherein a content of the hexafluoropropylene monomer unit is more than 5% by mass but not more than 11% by mass with respect to all monomer units of resin A; and resin B: a copolymer containing a vinylidene fluoride monomer unit and a hexafluoropropylene monomer unit and having a weight average molecular weight of from 100,000 to 1,000,000, wherein a content of the hexafluoropropylene monomer unit is more than 11% by mass but not more than 15% by mass with respect to all monomer units of resin B.

According to such an exemplary embodiment of the invention, a separator for a non-aqueous secondary battery that has excellent adhesion to an electrode and thermal dimensional stability, is provided.

Specifically, the porous layer contains from 30% by mass to 80% by mass of the filler, which makes it possible to secure adhesion to the electrode and thermal dimensional stability in a well-balanced manner. At least one resin (VDF-HFP copolymer) selected from the group consisting of resin A and resin B is used as the polyvinylidene fluoride type resin. Such a VDF-HFP copolymer forms an excellent three-dimensional network structure in the porous layer and has excellent binding property to the filler, so that excellent adhesion to the electrodes can be exhibited while high gas permeability is exhibited. In particular, the separator exhibits particularly excellent adhesion to the electrode in a case in which the separator is disposed between the positive electrode and the negative electrode, a stacked body is formed by rolling the electrodes and the separator, the stacked body is subjected to a heat pressing treatment in a state where the stacked body does not contain an electrolyte solution (hereinafter appropriately referred to as dry heat pressing) at a relatively low temperature of about 60° C. or higher but lower than 100° C.

In general, when a stacked body is formed by rolling the layered separators and electrodes, a heat press treatment (hereinafter appropriately referred to as wet heat pressing) is performed under a high temperature condition of 100° C. or higher, after an electrolyte solution is injected into an outer casing in a state where the stacked body is accommodated in the outer casing. In this case, a separator and an electrode adhere to each other after the separator is sufficiently impregnated with the electrolyte solution, so that excellent battery characteristics are likely to be advantageously obtained. However, in a case in which the stacked body is allowed to stand for a predetermined period of time, a phenomenon may occur in which a difference in internal stress between the electrode and the separator, the size of the stacked body, and rolling conditions, or the like cause the deformation of the stacked body to increase its thickness. The heat pressing is performed at a high temperature in a state where the electrolyte solution is contained, so that the battery may swell when the electrolyte solution is decomposed to generate a gas in the battery. Particularly, the phenomenon is likely to occur in a case in which the area of a jelly-roll battery or the like is increased, or in a case in which the internal stress remaining in the separator is high.

In a case in which a stacked body obtained by rolling electrodes and separators is subjected to dry heat pressing, a separator adheres to an electrode, so that deformation hardly occurs even if the stacked body is allowed to stand for a predetermined period of time, and no decomposition of the electrolyte solution occurs. If the separator can satisfactorily adhere to the electrode in a case in which dry heat pressing is performed at a lower temperature, it is expected that a battery having a larger area can be efficiently manufactured. A technique is also required, which subjects a stacked body to dry heat pressing to temporarily fix electrodes and separators, thereby improving the manufacturing yield of a battery. On this point, the separator according to an exemplary embodiment of the invention has excellent adhesion to the electrode in dry heat pressing at a low temperature, so that the separator suitably meets the expectations described above.

[Porous Substrate]

In the exemplary embodiments of the invention, a porous substrate means a substrate having pores or voids inside. Examples of the substrate include microporous membranes, porous sheets made of a fibrous material, such as nonwoven fabrics and paper-like sheets; and composite porous sheets including such a microporous membrane or porous sheet and at least one other porous layer laminated thereon. The microporous membrane means a membrane that has a large number of micropores inside, and has a structure in which the micropores are connected to each other, to allow gas or liquid to pass therethrough from one side to the other side.

Examples of the materials of the porous substrate include an organic material and an inorganic material which have electrical insulation properties.

From the viewpoint of imparting a shutdown function to the porous substrate, the porous substrate preferably contains a thermoplastic resin. The shutdown function refers to the following function. Namely, in a case in which the battery temperature increases, the material melts and blocks the pores of the porous substrate, thereby blocking migration of ions, to prevent thermal runaway of the battery. As the thermoplastic resin, a thermoplastic resin having a melting point of lower than 200° C. is preferable, and a polyolefin is particularly preferable.

As the porous substrate, a microporous membrane containing a polyolefin (referred to as a "polyolefin microporous membrane") is preferred. As the polyolefin microporous membrane, a polyolefin microporous membrane having excellent dynamic physical properties and ion permeability is preferably selected from polyolefin microporous membranes which have been applied to conventional separators for a non-aqueous secondary battery.

From the viewpoint of exhibiting the shutdown function, it is preferable that the polyolefin microporous membrane includes polyethylene, and it is preferable that the content of polyethylene is 95% by mass or more.

The polyolefin microporous membrane preferably contains polyethylene and polypropylene from the viewpoint of imparting heat resistance which prevents the membrane from easily breaking in a case of being exposed to a high temperature. An example of such a polyolefin microporous membrane is a microporous membrane in which polyethylene and polypropylene coexist in one layer. In such a microporous membrane, it is preferable that polyethylene is contained in an amount of 95% by mass or more and polypropylene is contained in an amount of 5% by mass or less, from the viewpoint of achieving both shutdown function and heat resistance. From the viewpoint of achieving both shutdown function and heat resistance, a polyolefin microporous membrane having a laminate structure of two or more layers, in which at least one layer includes polyethylene and at least one layer includes polypropylene, is also preferable.

It is preferable that the polyolefin contained in the polyolefin microporous membrane has a weight average molecular weight of from 100,000 to 5,000,000. When the weight average molecular weight is 100.000 or more, sufficient dynamic physical properties can be secured. Meanwhile, when the weight average molecular weight is 5,000,000 or less, the shutdown characteristics are favorable, and it is easy to form a membrane.

The polyolefin microporous membrane can be manufactured, for example, by the following method. Namely, an example is a method of forming a microporous membrane by extruding a molten polyolefin resin through a T-die to form a sheet, subjecting the sheet to a crystallization treatment, stretching the sheet, and subjecting the stretched sheet to a heat treatment to form a microporous membrane. Further, another example is a method of forming a microporous membrane by melting a polyolefin resin together with a plasticizer such as liquid paraffin, and extruding the melt through a T-die, followed by cooling, to form a sheet, stretching the sheet, extracting the plasticizer from the stretched sheet, and subjecting the sheet to a heat treatment to form a microporous membrane.

Examples of the porous sheet formed of a fibrous material include nonwoven fabrics and paper-like sheets formed of fibrous materials such as: polyesters such as polyethylene terephthalate; polyolefins such as polyethylene and polypropylene; and heat-resistant resins such as aromatic polyamide, polyimide, polyethersulfone, polysulfone, polyether ketone, and polyetherimide.

Here, a heat-resistant resin refers to a polymer having a melting point of 200° C. or higher, or to a polymer that does not have a melting point and has a decomposition temperature of 200° C. or higher.

Examples of the composite porous sheet include a sheet in which a functional layer is laminated on a microporous membrane or a porous sheet. Such a composite porous sheet is preferable in that further functions can be imparted by the functional layer. The functional layer is preferably a porous layer containing a heat-resistant resin, or a porous layer containing a heat-resistant resin and an inorganic filler from the viewpoint of imparting heat resistance.

Examples of the heat-resistant resin include one or two or more heat-resistant resins selected from aromatic polyamide, polyimide, polyethersulfone, polysulfone, polyetherketone, or polyetherimide.

Examples of the inorganic filler include metal oxides such as alumina and metal hydroxides such as magnesium hydroxide.

Examples of a method of providing a functional layer on a microporous membrane or a porous sheet include a method of applying a functional layer on a microporous membrane or a porous sheet, a method of joining a microporous membrane or a porous sheet and a functional layer together using an adhesive, and a method of bonding a microporous membrane or a porous sheet and a functional layer together by thermocompression.

In the separator according to an exemplary embodiment of the invention, the average pore size of the porous substrate is preferably from 20 nm to 100 nm. When the average pore size of the porous substrate is 20 nm or more, ions easily migrate and excellent battery performance is likely to be obtained. From such a viewpoint, the average pore size of the porous substrate is more preferably 30 nm or more, and still more preferably 40 nm or more. When the average pore size of the porous substrate is 100 nm or less, peel resistance strength between the porous substrate and the porous layer can be improved, and an excellent shutdown function can also be exhibited. From such a viewpoint, the average pore diameter of the porous substrate is more preferably 90 nm or less, and still more preferably 80 nm or less.

The average pore size of the porous substrate is a value measured using a palm porometer, and a value measured according to ASTM E 1294-89 using, for example, a palm porometer (CFP-1500-A manufactured by PMI).

The thickness of the porous substrate is preferably from 5 μm to 25 μm, from the viewpoint of obtaining favorable dynamic physical properties and internal resistance.

The Gurley value (JIS P8117 (2009)) of the porous substrate is preferably from 50 sec., 00 cc to 800 sec/100 cc, from the viewpoints of preventing a short circuit in a battery and obtaining ion permeability.

The porosity of the porous substrate is preferably from 20% to 60%, from the viewpoint of obtaining an appropriate membrane resistance and shutdown function.

The puncture resistance strength of the porous substrate is preferably 300 g or more, from the viewpoint of improving the manufacturing yield.

The surface of the porous substrate may also be subjected to a corona treatment, a plasma treatment, a flame treatment, a UV irradiation treatment, or the like for the purpose of improving wettability with a coating liquid for forming the porous layer.

[Porous Layer]

In the separator according to an exemplary embodiment of the invention, the porous layer has a large number of micropores inside, and has a structure in which these micropores are connected to each other, to allow gas or liquid to pass therethrough from one side to the other side.

In the separator according to an exemplary embodiment of the invention, the porous layer is provided as the outermost layer of the separator on one surface or both surfaces of the porous substrate, and is a layer which can bond to the electrode. It is preferable that the porous layer is provided on both surfaces of the porous substrate rather than only on one surface, from the viewpoint of providing a battery having excellent cycle characteristics. This is because, in a case in which the porous layer is provided on both surfaces of the porous substrate, both surfaces of the separator satisfactorily bond to the respective electrodes via the porous layer.

In the separator according to an exemplary embodiment of the invention, the porous layer contains a polyvinylidene fluoride type resin and a filler. It is important that a content of the filler in the porous layer is from 30% by mass to 80% by mass with respect to a total mass of the polyvinylidene fluoride type resin and the filler.

When the content of the filler is less than 30% by mass in the porous layer, it is difficult to secure the thermal dimensional stability of the separator. From this viewpoint, the content of the filler is preferably 40% by mass or more, and more preferably 50% by mass or more. When the content of the filler exceeds 80% by mass in the porous layer, it is difficult to secure the adhesive property of the porous layer to an electrode. From this viewpoint, the content of the filler is preferably 75% by mass or less, and more preferably 70% by mass or less.

From the viewpoints of adhesion to an electrode, thermal dimensional stability, and ion permeability, the mass (coating amount) of the porous layer per layer area is preferably from 0.5 g/m² to 5.0 g/m², and more preferably from 0.75 g/m² to 4.0 g/m². In a case in which the porous layer is provided on both surfaces of the porous substrate, the total mass of the porous layers on both surfaces is preferably from 1.0 g/m² to 10.0 g/m², and more preferably from 1.5 g/m² to 8.0 g/m².

The average thickness of the porous layer is preferably from 0.5 μm to 8 μm, and more preferably from 1 μm to 6 μm, with respect to one surface side of the porous substrate, from the viewpoint of securing adhesion to the electrode and high energy density.

From the viewpoints of ion permeability and dynamic physical strength, the porosity of the porous layer is preferably from 30% to 80%, and more preferably from 30% to 60%.

The average pore diameter of the porous layer is preferably from 10 nm to 200 nm. When the average pore size is 200 nm or less, non-uniformity of the pores in the porous layer can be suppressed, and the points of bonding to the porous substrate and the electrode are scattered with high uniformity, resulting in excellent adhesion of the porous substrate to the electrode. When the average pore diameter is 200 nm or less, uniformity of the migration of ions in the porous layer is high, whereby the cycle characteristics and load characteristics of the battery are excellent. When the average pore diameter is 10 nm or more, it is less likely that, when the porous layer is impregnated with an electrolyte solution and the resin contained in the porous layer swells, the pores of the porous layer will be blocked by the swelled resin.

-Polyvinylidene Fluoride Type Resin-

In the separator according to an exemplary embodiment of the invention, the porous layer contains a polyvinylidene fluoride type resin. It is important that the polyvinylidene fluoride type resin is at least one resin selected from the group consisting of the following resin A or resin B:

resin A: a copolymer containing a vinylidene fluoride monomer unit and a hexafluoropropylene monomer unit and having a weight average molecular weight of from 100,000 to 350,000, wherein a content of the hexafluoropropylene monomer unit is more than 5% by mass but not more than 11% by mass with respect to all monomer units of resin A; and resin B: a copolymer containing a vinylidene fluoride monomer unit and a hexafluoropropylene monomer unit and having a weight average molecular weight of from 100,000 to 1,000,000, wherein a content of the hexafluoropropylene monomer unit is more than 11% by mass but not more than 15% by mass with respect to all monomer units of resin B In the separator according to an exemplary embodiment of the invention, attention is paid to two types of VDF-HFP copolymers, from the viewpoint of improving adhesive property, particularly in the case of dry heat pressing at a low temperature. The adhesive property according to the dry heat pressing tends to be better as the fluidity of a polymer during heat pressing is higher. As the content of the hexafluoropropylene monomer unit is higher, or the weight average molecular weight of the VDF-HFP copolymer is lower, the adhesive property tends to be better. The resin A has a low hexafluoropropylene monomer unit content, but the resin A has a low weight average molecular weight, so that excellent adhesive property can be exhibited. The resin B has a high hexafluoropropylene monomer unit content, so that excellent adhesive property can be exhibited.

More specifically, the resin A has a weight average molecular weight of from 100,000 to 350.000. When the weight average molecular weight of the resin A is 100,000 or more, excellent mechanical strength as a porous layer is likely to be secured, and thermal dimensional stability and resistance to dissolution in an electrolyte solution are also excellent. From such a viewpoint, the weight average molecular weight of the polyvinylidene fluoride type resin is preferably 200,000 or more, and more preferably 250,000 or more. When the weight average molecular weight of the polyvinylidene fluoride type resin is 350,000 or less, it is preferable in that the adhesive property in the case of dry heat pressing is excellent. From the viewpoint of improving adhesive property at a lower temperature, the upper limit of the weight average molecular weight of the polyvinylidene fluoride type resin is more preferably 330,000 or less.

In the resin A, a content of the hexafluoropropylene monomer unit in the copolymer is more than 5% by mass but not more than 11% by mass with respect to all monomer units in the copolymer of resin A. When the content of the hexafluoropropylene monomer unit exceeds 5% by mass, it is preferable in that the fluidity of the polymer is improved, and the adhesive property in the case of dry heat pressing is improved. From such a viewpoint, the content of the hexafluoropropylene monomer unit is preferably 5.5% by mass or more, and more preferably 6% by mass or more. When the content of the hexafluoropropylene monomer unit is 11% by mass or less, it is preferable in that thermal dimensional stability and resistance to dissolution in an electrolyte solution are excellent. From such a viewpoint, the content of the hexafluoropropylene monomer unit is preferably 10.5% by mass or less, and more preferably 10% by mass or less.

The resin B has a weight average molecular weight of from 100,000 to 1,000,000. When the weight average molecular weight of the resin B is 100,000 or more, excellent mechanical strength as the porous layer is likely to be secured, and thermal dimensional stability and resistance to dissolution in an electrolyte solution are also excellent. From such a viewpoint, the weight average molecular weight of the polyvinylidene fluoride type resin is preferably 200,000 or more, and more preferably 300,000 or more. When the weight average molecular weight of the polyvinylidene fluoride type resin is 1,000,000 or less, it is preferable in that the adhesive property in the case of dry heat pressing is excellent. From the viewpoint of improving adhesive property at a lower temperature, the upper limit of the weight average molecular weight of the polyvinylidene fluoride type resin is more preferably 900,000 or less, still more preferably 800,000 or less, yet still more preferably 700,000 or less, further preferably 550,000 or less, and particularly preferably 500,000 or less.

In the resin B, a content of the hexafluoropropylene monomer unit in the copolymer is more than 11% by mass but not more than 15% by mass with respect to all monomer units in the copolymer of resin B. When the content of the hexafluoropropylene monomer unit exceeds 11% by mass, it is preferable in that the fluidity of the polymer is improved, and the adhesive property in the case of dry heat pressing is improved. From such a viewpoint, the content of the hexafluoropropylene monomer unit is preferably 11.5% by mass or more, and more preferably 12% by mass or more. When the content of the hexafluoropropylene monomer unit is 15% by mass or less, it is preferable in that the thermal dimensional stability and resistance to dissolution in an electrolyte solution are excellent. From such a viewpoint, the content of the hexafluoropropylene monomer unit is preferably 14.5% by mass or less, and more preferably 14% by mass or less.

The VDF-HFP copolymer may be a copolymer formed only of a vinylidene fluoride monomer unit and a hexafluoropropylene monomer unit, or may further include other copolymerization components that are copolymerizable with vinylidene fluoride. Examples of other components that are copolymerizable with vinylidene fluoride include tetrafluoroethylene, hexafluoropropylene, trifluoroethylene, trichlorethylene, and vinyl fluoride. One kind or more kinds thereof can be used.

The polyvinylidene fluoride type resin is obtained by emulsion polymerization or suspension polymerization.

The weight average molecular weight (MW) of the polyvinylidene fluoride type resin can be determined by gel permeation chromatography (GPC) under the following conditions.

<Conditions>
  Apparatus: Gel permeation chromatograph Alliance GPC 2000 type (manufactured by Waters)
  Column: TSKgel GMH 6-HT×2. TSKgel GMH 6-HTL×2 (manufactured by Tosoh Corporation)
  Column temperature: 140° C.
  Mobile phase: o-dichlorobenzene
  Column temperature: 140° C.
  Reference Material for Molecular Weight Calibration: monodispersed polystyrene (manufactured by Tosoh Corporation)

-Filler-

The porous layer in the separator according to an exemplary embodiment of the invention contains at least one kind selected from an organic filler or an inorganic filler. The filler may be used singly or in combination of two or more kinds. It is preferable that the filler is stable in an electrolyte solution and electrochemically stable. The filler has a heat-resistant temperature of preferably 150° C. or higher, and more preferably 200° C. or higher. The heat-resistant temperature of the filler refers to a temperature at which deformation (for example, shrinkage) or property deterioration occurs in a case in which an object for heating is heated.

Examples of the organic filler include crosslinked polymer particles of a crosslinked poly(meth)acrylic acid, a crosslinked poly(meth)acrylic acid ester, a crosslinked polysilicone, a crosslinked polystyrene, a crosslinked polydivinylbenzene, a crosslinked product of a styrene-divinylbenzene copolymer, polyimide, a melamine resin, a phenol resin, a benzoguanamine-formaldehyde condensate, or the like; and heat-resistant resin particles of polysulfone, polyacrylonitrile, aramide, polyacetal, thermoplastic polyimide, or the like. Among them, a crosslinked poly(meth)acrylic acid, a crosslinked poly(meth)acrylic acid ester, a crosslinked polysilicone, polyimide, and a melamine resin are preferable. Here, a heat-resistant resin refers to a polymer having a melting point of 200° C. or higher, or to a polymer that does not have a melting point and has a decomposition temperature of 200° C. or higher.

Examples of the inorganic filler include metal hydroxides such as aluminium hydroxide, magnesium hydroxide, calcium hydroxide, chromium hydroxide, zirconium hydroxide, cerium hydroxide, nickel hydroxide, and boron hydroxide; metal oxides such as silica, alumina, zirconia, titania, barium titanate, and magnesium oxide; carbonates such as calcium carbonate and magnesium carbonate; sulfates such as barium sulfate and calcium sulfate; and clay minerals such as calcium silicate and talc. Among them, metal hydroxides and metal oxides are preferable. From the viewpoint of imparting flame resistance and an effect of electricity removal, hydroxides or oxides of magnesium are preferable, and magnesium hydroxide is particularly preferable. The inorganic filler may be surface-modified with a silane coupling agent, or the like.

From the viewpoints of the adhesive property of the porous layer to the electrode, the ion permeability of the porous layer, the sliding properties of the porous layer, and the formability of the porous layer, the volume average particle diameter of the filler is preferably from 0.1 µm to 2.0 µm. The lower limit thereof is more preferably 0.2 µm or more, and still more preferably 0.3 µm or more. The upper limit thereof is more preferably 1.5 µm or less, and still more preferably 1.0 µm or less.

The filler has an arbitrary particle shape, and may have a spherical shape, an elliptical shape, a plate-like shape, a rod-like shape, or an amorphous shape. From the viewpoint of preventing short circuit of a battery, the filler is preferably plate-like particles or non-aggregated primary particles.

When the filler is contained in the porous layer, the surface of the porous layer is roughened, which allows the sliding properties of the surface of the separator to be improved. In a case in which the filler is plate-like particles or non-aggregated primary particles, the uniformity of the surface roughness of the porous layer is high, which is preferable in that the adhesive property of the porous layer to the electrode is less likely to be impaired.

-Physical Properties of Separator-

In an exemplary embodiment of the invention, a thermal shrinkage ratio in a machine direction of the separator when the separator is heat-treated at 135° C. for 30 minutes is preferably 20% or less. When the thermal shrinkage ratio at 135° C. is 20% or less, it is preferable in that the thermal dimensional stability of the separator is excellent, and the thermal safety of the battery can be improved. From such a viewpoint, the thermal shrinkage ratio of the separator at 135° C. is more preferably 15% or less. In an exemplary embodiment of the invention, the thermal shrinkage ratio of the separator at 135° C. is determined by adopting a measurement method of Examples which will be described later.

The thickness of the separator according to an exemplary embodiment of the invention is preferably from 5 μm to 35 μm, from the viewpoints of mechanical strength and energy density in a case of being incorporated into a battery.

The porosity of the separator according to an exemplary embodiment of the invention is preferably from 30% to 60%, from the viewpoints of mechanical strength, handling property, and ion permeability.

The Gurley value (JIS P8117 (2009)) of the separator according to an exemplary embodiment of the invention is preferably from 50 sec/100 cc to 800 sec/100 cc, in view of excellent balance between mechanical strength and membrane resistance.

In the separator according to an exemplary embodiment of the invention, from the viewpoint of ion permeability, a value obtained by subtracting the Gurley value of the porous substrate from the Gurley value of the separator having the porous layer provided on the porous substrate is preferably 300 sec/100 ml (sec/100 cc) or less, more preferably 150 sec/100 ml (sec/100 cc) or less, and still more preferably 100 sec/100 ml (sec/100 cc) or less.

The membrane resistance of the separator according to an exemplary embodiment of the invention is preferably from 1 ohm-cm$^2$ to 10 ohm-cm$^2$, from the viewpoint of the load characteristics of the battery. The membrane resistance herein refers to a resistance value of a separator impregnated with an electrolyte solution (1M LiBF$_4$-propylene carbonate:ethylene carbonate [mass ratio: 1:11]) and measured by an alternating current method at 20° C.

The tortuosity ratio of the separator according to an exemplary embodiment of the invention is preferably from 1.5 to 2.5, from the viewpoint of ion permeability.

[Method of Manufacturing Separator]

The above-described separator according to an exemplary embodiment of the invention can be manufactured, for example, by a wet coating method having the following processes (i) to (iii):

(i) a process of coating a coating liquid containing polyvinylidene fluoride type resin and a filler to a porous substrate to form a coated layer;

(ii) a process of immersing the porous substrate having the coated layer formed thereon in a coagulation liquid to solidify the polyvinylidene fluoride type resin while inducing a phase separation in the coated layer, to form a porous layer on the porous substrate, thereby obtaining a composite membrane; and (iii) a process of washing with water and drying the composite membrane.

The coating liquid is prepared by dissolving a polyvinylidene fluoride type resin in a solvent and dispersing a filler in the solvent.

The solvent used for preparing the coating liquid contains a solvent which dissolves a polyvinylidene fluoride type resin (hereinafter, also referred to as a "good solvent"). Examples of the good solvent include polar amide solvents such as N-methylpyrrolidone, dimethylacetamide, dimethylformamide, and dimethylformamide.

From the viewpoint of forming a porous layer having an excellent porous structure, the solvent used for preparing the coating liquid preferably contains a phase-separation agent that induces phase separation. Therefore, the solvent used for preparing the coating liquid is preferably a mixed solvent containing a good solvent and a phase-separation agent. The phase-separation agent is preferably mixed with a good solvent in such an amount that a suitable viscosity for coating can be secured. Examples of the phase-separation agent include water, methanol, ethanol, propyl alcohol, butyl alcohol, butanediol, ethylene glycol, propylene glycol, and tripropylene glycol.

From the viewpoint of forming an excellent porous structure, the solvent used for preparing the coating liquid is preferably a mixed solvent containing a good solvent and a phase-separation agent, and containing 60% by mass or more of the good solvent and 40% by mass or less of the phase-separation agent. The concentration of the polyvinylidene fluoride type resin in the coating liquid is preferably from 3% by mass to 10% by mass, from the viewpoint of forming an excellent porous structure. A solid content concentration in the coating liquid is preferably from 3.5% by mass to 7% by mass.

Examples of coating manner of the coating liquid to the porous substrate include a Mayer bar, a die coater, a reverse roll coater, and a gravure coater. In a case in which the porous layers are formed on both surfaces of the porous substrate, it is preferable that the coating liquid is simultaneously applied to both the surfaces of the substrate, from the viewpoint of productivity.

The coagulation liquid generally contains a good solvent and a phase-separation agent which are used for preparing a coating liquid, and water. From the viewpoint of productivity, it is preferable that the mixing ratio between the good solvent and the phase-separation agent is determined according to the mixing ratio of the mixed solvent used for preparing the coating liquid. From the viewpoints of the formation of a porous structure and productivity, the content of water in the coagulation liquid is preferably from 40% by mass to 90% by mass.

The coagulation liquid preferably contains 40% by mass to 90% by mass of water and 10% by mass to 60% by mass of the mixed solvent. Here, the mixed solvent preferably contains 80% by mass or more of a good solvent and 20% by mass or less of a phase-separation agent. The temperature of the coagulation liquid is, for example, from 20° C. to 50° C.

The separator according to an exemplary embodiment of the invention can also be manufactured by a dry coating method. The dry coating method is a method in which a coating liquid containing a polyvinylidene fluoride type resin and a filler is applied onto a porous substrate to form a coated layer, followed by drying the coated layer to solidify the coated layer, thereby forming a porous layer on the porous substrate. However, the dry coating method is likely to provide a denser porous layer than that of the wet coating method, so that the wet coating method is preferable in that the wet coating method can provide an excellent porous structure.

The separator according to an exemplary embodiment of the invention can also be manufactured by a method in which a porous layer is produced as an independent sheet, and laminating the porous layer on a porous substrate using thermocompression bonding or an adhesive in a state where the porous layer is stacked on the porous substrate. The method for obtaining a porous layer as an independent sheet may be, for example, a method in which a porous layer is formed on a release sheet by the wet coating method or the dry coating method mentioned above, and the porous layer is peeled off from the release sheet.

<Non-Aqueous Secondary Battery>

The non-aqueous secondary battery according to an exemplary embodiment of the invention is a non-aqueous secondary battery in which an electromotive force is obtained by doping and dedoping lithium. The non-aqueous secondary battery includes a positive electrode, a negative electrode, and the separator for a non-aqueous secondary battery according to the exemplary embodiment of the invention described above. The term "dope" means occlusion, support, adsorption, or insertion, and means a phenomenon in which a lithium ion enters into an active material of an electrode such as a positive electrode or the like.

The non-aqueous secondary battery according to an exemplary embodiment of the invention includes a positive electrode, a negative electrode, and a separator disposed between the positive electrode and the negative electrode. The non-aqueous secondary battery according to an exemplary embodiment of the invention has a structure in which a battery element, in which a negative electrode and a positive electrode face each other via a separator, is impregnated with an electrolyte and is enclosed in an outer casing. The non-aqueous secondary battery according to an exemplary embodiment of the invention is suitable for non-aqueous electrolyte secondary batteries and, in particular, for lithium ion secondary batteries.

The non-aqueous secondary battery according to an exemplary embodiment of the invention has excellent cycle characteristics and thermal safety when the separator according to an exemplary embodiment of the invention is applied.

Hereinafter, aspect examples of the positive electrode, negative electrode, electrolyte solution, and outer casing included in the non-aqueous secondary battery according to an exemplary embodiment of the invention will be described.

The positive electrode may have a structure in which an active material layer containing a positive electrode active material and a binder resin is formed on a current collector. The active material layer may further contain a conductive auxiliary agent.

Examples of the positive electrode active material include a lithium-containing transition metal oxide, and specific examples thereof include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{2/3}O_2$, and $LiAl_{1/4}Ni_{3/4}O_2$. Examples of the binder resin include a polyvinylidene fluoride type resin.

Examples of the conductive auxiliary agent include carbon materials such as acetylene black. Ketjen black, and graphite powder.

Examples of the current collector include an aluminum foil, a titanium foil, and a stainless steel foil, each having a thickness of from 5 μm to 20 μm.

In the non-aqueous secondary battery according to an exemplary embodiment of the invention, when the porous layer of the separator is disposed on the positive electrode side, since a polyvinylidene fluoride type resin has excellent oxidation resistance, this is advantageous because application of a positive electrode active material that can be operated at a high voltage of 4.2 V or more, such as $LiMn_{1/2}Ni_{1/2}O_2$ and $LiCo_{1/3}Mn_{1/3}Ni_{1/3}O_2$, is facilitated.

The negative electrode may have a structure in which an active material layer containing a negative electrode active material and a binder resin is formed on a current collector. The active material layer may further contain a conductive auxiliary agent. Examples of the negative electrode active material include materials capable of electrochemically occluding lithium. Specific examples thereof include carbon materials; and alloys of lithium in combination with silicon, tin, aluminum, or the like. Examples of the binder resin include a polyvinylidene fluoride type resin and a styrene-butadiene rubber. Examples of the conductive auxiliary agent include carbon materials such as acetylene black, Ketjen black, and graphite powder. Examples of the current collector include a copper foil, a nickel foil, and a stainless steel foil, each having a thickness of from 5 μm to 20 μm. Instead of using the negative electrode described above, a metal lithium foil may be used as the negative electrode.

The electrolyte solution is, for example, a solution in which a lithium salt is dissolved in a non-aqueous solvent. Examples of the lithium salt include $LiPF_6$, $LiBF_4$, and $LiClO_4$. Examples of the non-aqueous solvent include cyclic carbonates such as ethylene carbonate, propylene carbonate, fluoroethylene carbonate, difluoroethylene carbonate, and vinylene carbonate; chain carbonates such as dimethyl carbonate, diethyl carbonate, ethyl methyl carbonate, and a fluorine-substituted compound thereof; and cyclic esters such as γ-butyrolactone and γ-valerolactone. These non-aqueous solvent may be used singly, or in combination. As the electrolyte solution, a solution is preferred, which is obtained by mixing a cyclic carbonate and a chain carbonate at a mass ratio (cyclic carbonate:chain carbonate) of from 20:80 to 40:60, and dissolving a lithium salt therein to give a concentration of from 0.5 M to 1.5 M.

Examples of the outer casing include a metal can and an aluminum laminated film pack. Examples of the shape of a battery include a square shape, a cylindrical shape, and a coin shape. The separator of the disclosure is suitable for any shape.

The separator according to an exemplary embodiment of the invention has excellent adhesive property to an electrode. Accordingly, in the battery including the separator according to an exemplary embodiment of the invention, a space is less likely to be formed between the electrode and the separator, even if an impact from the outside is applied or even due to expansion or shrinkage of the electrode accompanying charging and discharging. Therefore, the separator according to an exemplary embodiment of the invention is suitable for a soft pack battery including an aluminum laminated film pack as an outer casing. The separator according to an exemplary embodiment of the invention can provide a soft pack battery exhibiting high battery performance.

<Method of Manufacturing Non-Aqueous Secondary Battery>

The non-aqueous secondary battery according to an exemplary embodiment of the invention described above can be manufactured by sequentially carrying out, for example, a process of disposing a separator between a positive electrode and a negative electrode, and rolling the electrodes and the separator to form a stacked body, a process of subjecting the stacked body to a heat pressing treatment under a temperature condition of 60° C. or higher but lower than 100° C. to form a battery element, and a process of accommodating the battery element in an outer casing in a state in which the battery element is impregnated with an electrolyte solution.

By carrying out dry heat pressing at such a low temperature, deformation tends not to occur even when the stacked body is allowed to stand for a predetermined period of time, and decomposition of the electrolyte solution can be prevented. Therefore, it is possible to efficiently manufacture a battery having a larger surface area. By subjecting the stacked body to dry heat pressing, the manufacturing yield of the battery can be improved from the viewpoint that the electrode and the separator are temporarily fixed, which allows positional displacement between the electrode and the separator to be prevented.

The above described process of accommodating the battery element in an outer casing in a state in which the battery element is impregnated with an electrolyte solution includes a case in which the battery element is accommodated in the outer casing after the battery element is impregnated with the electrolyte solution, and a case in which the battery element is impregnated with the electrolyte solution after the battery element is accommodated in the outer casing. After the battery element is accommodated in the outer casing, wet heat pressing may be carried out as usual or not be carried out.

The manufacturing method of the non-aqueous secondary battery according to an exemplary embodiment of the invention is not limited to the above-described manufacturing method, and manufacture can also be performed by accommodating a stacked body in which the separator according to an exemplary embodiment of the invention described above is disposed between a positive electrode and a negative electrode, in an outer casing in a state in which the stacked body is impregnated with an electrolyte solution, and pressing the stacked body from outside of the outer casing.

The separator according to an exemplary embodiment of the invention can be adhered to the electrodes by stacking. Therefore, in the manufacture of the battery, the aforementioned pressing is not an indispensable step; however, in order to improve the adhesion between the electrode and the separator, it is preferable to perform pressing. Furthermore, in order to improve the adhesion between the electrode and the separator, it is preferable that the pressing is pressing with heating (heat pressing).

In a case of manufacturing the non-aqueous secondary battery, a method of disposing a separator between a positive electrode and a negative electrode may be a method of stacking at least one layer each of a positive electrode, a separator, and a negative electrode on one another, in this order (a stacking method), or may be a method in which a positive electrode, a separator, a negative electrode, and a separator are stacked in this order, and rolled in the length direction. The rolling method is likely to exhibit the effect of the separator according to an exemplary embodiment of the invention.

EXAMPLES

Hereinafter, a separator and non-aqueous secondary battery of an exemplary embodiment of the invention will be described in more detail with reference to Examples. However, the separator and the non-aqueous secondary battery according to the exemplary embodiment of the invention are not limited to the following Examples.

<Measurement Method and Evaluation Method>

The measurement methods and evaluation methods applied in the examples of the invention and comparative examples are as follows.

[Thickness]

Measurement of thickness was performed using a contact thickness meter (LITEMATIC manufactured by Mitutoyo Corporation). A cylindrical terminal having a diameter of 5 mm was used as a measuring terminal, and was adjusted to apply a load of 7 g during the measurement. An average value of the thickness at 20 points was obtained. The total thickness of the porous layers was determined by subtracting the thickness of the porous substrate from the thickness of the separator.

[Mass of Porous Layer]

The mass of a sample (separator and porous substrate) was determined by cutting the sample into a 10 cm×30 cm piece, and measuring the mass of the piece. The basis weight was determined by dividing the mass by the area. Next, by subtracting the basis weight of the porous substrate from the basis weight of the separator, the mass (applied amount) of the porous layer was determined. In a case in which the porous layer was formed on both surfaces, the mass of the porous layer per layer was determined by dividing the total mass of the porous layers by 2.

[Porosity]

The porosity of each of the porous substrate and the separator was determined according to the following calculation method.

In a case in which constituent materials are a, b, c, . . . , n; the masses of each of the constituent materials are Wa, Wb, Wc, . . . , Wn (g/cm$^2$); the true densities of each of the constituent materials are da, db, dc, . . . dn (g/cm$^3$), and the thickness is t (cm), the porosity ε (%) is determined by the following formula.

$$\varepsilon = \{1-(Wa/da+Wb/db+Wc/dc+ \ldots +Wn/dn)/t\} \times 100$$

[Weight Average Molecular Weight of Polyvinylidene Fluoride Type Resin]

The weight average molecular weight (MW) of the polyvinylidene fluoride type resin was determined by gel permeation chromatography (GPC).

Apparatus: Gel permeation chromatograph Alliance GPC 2000 type (manufactured by Waters)

Column: TSKgel GMH 6-HT×2, TSKgel GMH 6-HTL×2 (manufactured by Tosoh Corporation)

Column temperature: 140° C.

Mobile phase: o-dichlorobenzene

Column temperature: 140° C.

Reference Material for Molecular Weight Calibration: monodispersed polystyrene (manufactured by Tosoh Corporation)

[Composition of Polyvinylidene Fluoride Type Resin]

20 mg of a polyvinylidene fluoride type resin was dissolved in 0.6 ml of heavy dimethyl sulfoxide at 100° C., and $^{19}$F-NMR spectrum was measured at 100° C. The composition of the polyvinylidene fluoride type resin was determined from the NMR spectrum.

[Volume Average Particle Diameter of Filler]

The filler was dispersed in water containing a nonionic surfactant (TRITON X-100), and particle size distribution of the filler was determined with a laser diffraction particle size distribution analyzer (MASTERSIZER 2000, manufactured by Sysmex Corporation). The particle diameter at 50% cumulative volume calculated from a smaller particle side in a volume particle size distribution was defined as the volume average particle diameter (μm) of the filler.

[Gurley Value]

The Gurley value (sec/100 cc) of the separator was measured with a Gurley type densometer (G-B2C manufactured by Toyo Seiki Seisaku-sho, Ltd.) in accordance with JIS P8117 (2009).

[Thermal Shrinkage Ratio at 135° C.]

A separator was cut into an 18 cm (MD direction)×6 cm (TD direction) test piece. On a line which divides the test piece into two in the TD direction, two marks were placed on two points (point A and point B) at 2 cm and 17 cm from one end, respectively. On a line which divides the test piece into two in the MD direction, two marks were placed on two points (point C and point D) at 1 cm and 5 cm from one end, respectively. The test piece was held by a clip at a point between the end of the piece nearest to the point A and the point A, and the test piece was suspended in an oven at 135° C. such that the MD direction of the test piece was the gravity direction to perform a heat treatment for 30 minutes under no tension. The lengths AB and the lengths CD before and after the heat treatment were measured, and a thermal shrinkage ratio (%) was calculated from the following formula.

thermal shrinkage ratio (%) in *MD* direction={(length *AB* before heat treatment−length *AB* after heat treatment)/length *AB* before heat treatment}×100 thermal shrinkage ratio (%) in *TD* direction={(length *CD* before heat treatment−length *CD* after heat treatment)/length *CD* before heat treatment}×100

[Adhesive Force with Electrode by Dry Heat Pressing]

A negative electrode (one surface application) and an aluminum foil (thickness: 20 μm) were cut into a size of 1.5 cm in width and 7 cm in length, and the separator was cut into a size of 1.8 cm in width and 7.5 cm in length. A stacked body (aluminum foil/separator/negative electrode) was prepared by stacking the negative electrode, the separator, and the aluminum foil in this order. The thus-prepared stacked body was accommodated in an aluminum laminated film pack. Next, the inside of the pack was put in to a vacuum state using a vacuum sealer, and the stacked body was subjected to heat pressing (dry heat pressing) together with the pack using a heat pressing machine, whereby the negative electrode and the separator were adhered to each other. The heat pressing conditions were a load of 1 MPa, a pressing time of 30 seconds and a temperature of 80° C. Thereafter, the pack was opened, the stacked body taken out, the aluminum foil removed, and the stacked body used as a measurement sample.

Next, the non-applied surface of the negative electrode of the measurement sample was fixed onto a metal plate with double-sided tape, and the metal plate was fixed onto a TENSILON lower chuck (manufactured by A & D, STB-1225S). At this time, the metal plate was fixed to the TENSILON so that the length direction of the measurement sample was set in the direction of gravity. About 2 cm from the lower end of the separator was peeled from the positive electrode, and the end part thereof was fixed to an upper chuck so that a tensile angle (angle of the separator with respect to the measurement sample) was 180°. The separator was pulled at a tension rate of 20 mm/min, and the load at which the separator was peeled off from the negative electrode was measured. The load was taken at intervals of 0.4 mm between 10 mm to 40 mm from the start of the measurement, and this was taken as the adhesive force with the electrode. This adhesive force was measured three times. The average thereof was calculated, and taken as the adhesive force with the electrode.

The negative electrode was produced in the following manner.

300 g of artificial graphite as a negative electrode active material, 7.5 g of a water-soluble dispersion containing 40% by mass of a modified styrene-butadiene copolymer as a binder, 3 g of carboxymethylcellulose as a thickener, and an appropriate amount of water were stirred and mixed in a double-arm mixer, thereby preparing a slurry for forming a negative electrode. The slurry for forming a negative electrode was applied onto a copper foil having a thickness of 10 μm as a negative electrode current collector, dried, followed by pressing, to produce a negative electrode having a negative electrode active material layer.

[Productivity of Battery Element]

Two separators (each 108 mm in width) were prepared for each of the following examples and comparative examples, and the two separators were stacked. One end of the stacked separators in the MD direction was wound around a stainless steel core. A positive electrode (width: 106.5 mm), to which a lead tab was welded, was sandwiched between the two separators, and a negative electrode (width: 107 mm), to which a lead tab was welded, was disposed on one separator. The stacked body was rolled to produce a rolled-stacked body, and 50 rolled-stacked bodies were continuously produced. The rolled-stacked body was subjected to normal temperature pressing (1 MPa, 30 seconds), followed by hot pressing (80° C., 1 MPa, 30 seconds) to obtain a plate-like battery element. Then, a change in the thickness of the battery element after 1 hour had elapsed since hot pressing was observed. A case in which the change in the thickness was 3% or less was deemed acceptable. A case in which the change in the thickness was more than 3% was rejected. The number ratio (%) of the accepted wound-electrode bodies was calculated, and classified as follows.

<Classification>

A: The number ratio (%) of the accepted rolled electrode bodies is 100%.

B: The number ratio (%) of the accepted rolled electrode bodies is 95% or more but less than 100%.

C: The number ratio (%) of the accepted rolled electrode bodies is less than 95%.

The negative electrode was produced in the same manner as described in the evaluation of "Adhesive Force with Electrode". The positive electrode was produced as follows.

91 g of lithium cobaltate powder as a positive electrode active material, 3 g of acetylene black as a conductive auxiliary agent, and 3 g of polyvinylidene fluoride as a binder were dissolved in N-methyl-pyrrolidone (NMP) so that a polyvinylidene fluoride concentration was set to 5% by mass, and stirred in a double arm mixer to prepare a slurry for forming a positive electrode. This slurry for forming a positive electrode was applied on one surface of an aluminum foil having a thickness of 20 μm, dried, and pressed to obtain a positive electrode having a positive electrode active material layer formed on one surface.

[Battery Cycle Characteristics]

The battery element produced as described above was accommodated in an aluminum pack, and the battery element was impregnated with an electrolyte solution, following by sealing using a vacuum sealer. 1 M (mol/L) $LiPF_6$-ethylene carbonate:ethyl methyl carbonate (mass ratio 3:7) was used as the electrolyte solution. Thereafter, the aluminum pack accommodating the battery element and the electrolyte solution was subjected to heat pressing (load: 1 MPa, temperature: 90° C.) using a heat pressing machine, to produce a secondary battery for evaluation. The produced secondary battery was subjected to charge and discharge of 100 cycles. Evaluation of cycle characteristics was carried out under the charge condition of constant-current constant-voltage charge at 0.7 C and 4.2 V. and the discharge condition of constant-current discharge at 0.5 C and 2.75 V cut-off.

A change in the thickness of the secondary battery after subjecting 100 cycles of charging and discharging was observed. A case in which the change in the thickness of the secondary battery was 8% or less was deemed acceptable. A case in which the change in the thickness of the secondary battery was more than 8% was rejected. The number ratio (%) of the accepted rolled electrode bodies was calculated, and classified as follows.

<Classification>

A: The number ratio (%) of the accepted rolled electrode bodies is 100%.

B: The number ratio (° %) of the accepted rolled electrode bodies is 95% or more but less than 100%.

C: The number ratio (%) of the accepted rolled electrode bodies is less than 95%.

Example 1

A VDF-HFP copolymer (resin A) having a weight average molecular weight of 200.000 and in which the content of a hexafluoropropylene monomer unit is 5.7% by mass was used as a polyvinylidene fluoride type resin. Magnesium hydroxide particles having an average particle diameter of 0.8 μm were used as a filler. The VDF-HFP copolymer was dissolved in a solvent (dimethylacetamide:tripropylene glycol=80:20 [mass ratio]) to produce a polymer solution. The concentration of the polymer in the polymer solution was set to 5% by mass. The filler was added to the polymer solution, followed by uniformly stirring to produce a coating liquid having a mass ratio of the polyvinylidene fluoride type resin to the filler of 40:60.

The coating liquid was uniformly applied to both surfaces of a porous polyethylene microporous membrane (thickness: 9 μm, porosity: 40%, Gurley value: 152 sec/100 cc), which is a porous substrate, and the polyethylene microporous membrane having the coated membrane surfaces was then immersed in a coagulation liquid to solidify the coated membrane surfaces. The composition of the coagulation liquid is such that dimethylacetamide:tripropylene glycol:water=30:8:62 [mass ratio], and the temperature of the coagulation liquid was set to 40° C. After coagulation, the coated membrane surfaces were washed with water, and then dried to obtain a separator having porous layers formed on each of both surfaces of the polyethylene microporous membrane.

The physical properties and evaluation results of the separator are shown in Table 1. Similarly, the other examples and comparative examples are also collectively shown in Table 1.

Example 2

A separator in which porous layers were formed on both surfaces of a polyethylene microporous membrane was produced, measured, and evaluated in the same manner as in Example 1 except that a VDF-HFP copolymer (resin B) having a weight average molecular weight of 630.000 and in which the content of a hexafluoropropylene monomer unit is 13.8% by mass was used as a polyvinylidene fluoride type resin.

Example 3

A separator in which porous layers were formed on both surfaces of a polyethylene microporous membrane was produced, measured, and evaluated in the same manner as in Example 1 except that a VDF-HFP copolymer (resin B) having a weight average molecular weight of 390,000 and in which the content of a hexafluoropropylene monomer unit is 14.5% by mass was used as a polyvinylidene fluoride type resin.

Example 4

A separator in which porous layers were formed on both surfaces of a polyethylene microporous membrane was produced, measured, and evaluated in the same manner as in Example 3 except that a coating liquid having a mass ratio of a polyvinylidene fluoride type resin to a filler of 65:35 was used.

Example 5

A separator in which porous layers were formed on both surfaces of a polyethylene microporous membrane was produced, measured, and evaluated in the same manner as in Example 3 except that a coating liquid having a mass ratio of a polyvinylidene fluoride type resin to a filler of 55:45 was used.

Example 6

A separator in which porous layers were formed on both surfaces of a polyethylene microporous membrane was produced, measured, and evaluated in the same manner as in Example 3 except that a coating liquid having a mass ratio of a polyvinylidene fluoride type resin to a filler of 45:55 was used.

Example 7

A separator in which porous layers were formed on both surfaces of a polyethylene microporous membrane was produced, measured, and evaluated in the same manner as in Example 3 except that a coating liquid having a mass ratio of a polyvinylidene fluoride type resin to a filler of 35:65 was used.

Example 8

A separator in which porous layers were formed on both surfaces of a polyethylene microporous membrane was produced, measured, and evaluated in the same manner as in Example 3 except that a coating liquid having a mass ratio of a polyvinylidene fluoride type resin to a filler of 25:75 was used.

Example 9

A separator in which porous layers were formed on both surfaces of a polyethylene microporous membrane was produced, measured, and evaluated in the same manner as in Example 3 except that a porous layer was thickly applied so that the mass of the porous layer per layer area was set to 5.0 g/m².

Example 10

A separator in which porous layers were formed on both surfaces of a polyethylene microporous membrane was produced, measured, and evaluated in the same manner as in Example 1 except that a VDF-HFP copolymer (resin A) having a weight average molecular weight of 330.000 and in which the content of a hexafluoropropylene monomer unit is 10.0% by mass was used as a polyvinylidene fluoride type resin.

Example 11

A separator in which porous layers were formed on both surfaces of a polyethylene microporous membrane was produced, measured, and evaluated in the same manner as in Example 1 except that a VDF-HFP copolymer (resin B) having a weight average molecular weight of 480,000 and in which the content of a hexafluoropropylene monomer unit is 11.5% by mass was used as a polyvinylidene fluoride type resin.

Example 12

A separator in which porous layers were formed on both surfaces of a polyethylene microporous membrane was produced, measured, and evaluated in the same manner as in Example 1 except that a VDF-HFP copolymer (resin B) having a weight average molecular weight of 860,000 and in which the content of a hexafluoropropylene monomer unit is 12.4% by mass was used as a polyvinylidene fluoride type resin.

Comparative Example 1

A separator in which porous layers were formed on both surfaces of a polyethylene microporous membrane was produced, measured, and evaluated in the same manner as in Example 1 except that a VDF-HFP copolymer having a weight average molecular weight of 1,130.000 and in which the content of a hexafluoropropylene monomer unit is 5.4% by mass was used as a polyvinylidene fluoride type resin.

Comparative Example 2

A separator in which porous layers were formed on both surfaces of a polyethylene microporous membrane was produced, measured, and evaluated in the same manner as in Example 1 except that a VDF-HFP copolymer having a weight average molecular weight of 280,000 and in which the content of a hexafluoropropylene monomer unit is 16.0% by mass was used as a polyvinylidene fluoride type resin.

Comparative Example 3

A separator in which porous layers were formed on both surfaces of a polyethylene microporous membrane was produced, measured, and evaluated in the same manner as in Example 1 except that a VDF-HFP copolymer having a weight average molecular weight of 400,000 and in which the content of a hexafluoropropylene monomer unit is 4.0% by mass was used as a polyvinylidene fluoride type resin.

Comparative Example 4

A separator in which porous layers were formed on both surfaces of a polyethylene microporous membrane was produced, measured, and evaluated in the same manner as in Example 1 except that a coating liquid having a mass ratio of a polyvinylidene fluoride type resin to a filler of 75:25 was used.

Comparative Example 5

A separator in which porous layers were formed on both surfaces of a polyethylene microporous membrane was produced, measured, and evaluated in the same manner as in Example 1 except that a coating liquid having a mass ratio of a polyvinylidene fluoride type resin to a filler of 15:85 was used.

Comparative Example 6

A separator in which porous layers were formed on both surfaces of a polyethylene microporous membrane was produced, measured, and evaluated in the same manner as in Example 1 except that a VDF-HFP copolymer having a weight average molecular weight of 440,000 and in which the content of a hexafluoropropylene monomer unit is 10.6% by mass was used as a polyvinylidene fluoride type resin.

TABLE 1

| | VDF-HFP copolymer | | Filler | | Physical properties of porous layer | | Physical properties of separator |
| --- | --- | --- | --- | --- | --- | --- | --- |
| | MW | HFP (mass %) | Material | Filler content (% by mass) | Mass of layer (g/m²) | Total thickness (μm) | Porosity (%) |
| Example 1 | 200,000 | 5.7 | $Mg(OH)_2$ | 60 | 3.0 | 6.2 | 53 |
| Example 2 | 630,000 | 13.8 | $Mg(OH)_2$ | 60 | 3.0 | 4.9 | 48 |
| Example 3 | 390,000 | 14.5 | $Mg(OH)_2$ | 60 | 3.0 | 5.5 | 51 |
| Example 4 | 390,000 | 14.5 | $Mg(OH)_2$ | 35 | 3.0 | 6.0 | 52 |
| Example 5 | 390,000 | 14.5 | $Mg(OH)_2$ | 45 | 3.0 | 5.8 | 51 |
| Example 6 | 390,000 | 14.5 | $Mg(OH)_2$ | 55 | 3.0 | 5.6 | 51 |
| Example 7 | 390,000 | 14.5 | $Mg(OH)_2$ | 65 | 3.0 | 5.5 | 51 |
| Example 8 | 390,000 | 14.5 | $Mg(OH)_2$ | 75 | 3.0 | 5.4 | 51 |
| Example 9 | 390,000 | 14.5 | $Mg(OH)_2$ | 60 | 5.0 | 6.8 | 49 |
| Example 10 | 330,000 | 10.0 | $Mg(OH)_2$ | 60 | 3.0 | 5.3 | 50 |

TABLE 1-continued

| | | | | | | | |
|---|---|---|---|---|---|---|---|
| Example 11 | 480,000 | 11.5 | Mg(OH)₂ | 60 | 3.0 | 5.1 | 49 |
| Example 12 | 860,000 | 12.4 | Mg(OH)₂ | 60 | 3.0 | 5.7 | 51 |
| Comparative Example 1 | 1,130,000 | 5.4 | Mg(OH)₂ | 60 | 3.0 | 6.1 | 53 |
| Comparative Example 2 | 280,000 | 16.0 | Mg(OH)₂ | 60 | 3.0 | 5.9 | 52 |
| Comparative Example 3 | 400,000 | 4.0 | Mg(OH)₂ | 60 | 3.0 | 5.4 | 50 |
| Comparative Example 4 | 200,000 | 5.7 | Mg(OH)₂ | 25 | 3.0 | 6.2 | 52 |
| Comparative Example 5 | 200,000 | 5.7 | Mg(OH)₂ | 85 | 3.0 | 5.0 | 50 |
| Comparative Example 6 | 440,000 | 10.6 | Mg(OH)₂ | 60 | 3.0 | 5.5 | 51 |

| | Physical properties of separator | | Evaluation of characteristics | | |
|---|---|---|---|---|---|
| | Gurley value (s/100 cc) | Thermal shrinkage ratio MD/TD at 135° C. (%) | Adhesive force with electrode (N/15 mm) | Productivity of battery element | Cycling characteristics of battery |
| Example 1 | 195 | 15.5/13.9 | 0.044 | B | B |
| Example 2 | 204 | 15.0/13.3 | 0.070 | B | B |
| Example 3 | 183 | 15.2/13.6 | 0.105 | A | A |
| Example 4 | 220 | 18.8/18.0 | 0.154 | A | A |
| Example 5 | 211 | 17.9/17.3 | 0.138 | A | A |
| Example 6 | 186 | 16.5/15.1 | 0.110 | A | A |
| Example 7 | 180 | 15.0/13.5 | 0.102 | A | A |
| Example 8 | 173 | 14.6/12.9 | 0.097 | B | B |
| Example 9 | 185 | 14.1/12.5 | 0.142 | A | A |
| Example 10 | 187 | 15.3/13.4 | 0.095 | B | B |
| Example 11 | 192 | 15.1/13.7 | 0.104 | A | A |
| Example 12 | 193 | 15.0/13.2 | 0.050 | B | B |
| Comparative Example 1 | 205 | 14.9/13.6 | 0.023 | C | C |
| Comparative Example 2 | 191 | 23.0/21.1 | 0.008 | C | C |
| Comparative Example 3 | 192 | 15.1/13.7 | 0.004 | C | C |
| Comparative Example 4 | 235 | 25.8/24.1 | 0.046 | A | A |
| Comparative Example 5 | 175 | 14.2/12.7 | 0.006 | C | C |
| Comparative Example 6 | 198 | 15.7/13.9 | 0.009 | C | C |

As shown in Table 1, the examples, in which the specific polyvinylidene fluoride type resins were contained and the content of the filler was set in a specific range, demonstrated a suppressed thermal shrinkage ratio and exhibited excellent adhesion to the electrode according to dry heat pressing.

In contrast, Comparative Example 1, in which the weight average molecular weight of the polyvinylidene fluoride type resin exceeded 1,000,000, exhibited poor adhesion to the electrode during dry heat pressing. Comparative Example 2, in which the content ratio of the HFP monomer unit of the polyvinylidene fluoride type resin exceeded 15% by mass, could not achieve a low thermal shrinkage ratio, and exhibited poor thermal dimensional stability. Comparative Example 3, in which the content ratio of the HFP monomer unit of the polyvinylidene fluoride type resin was low, and Comparative Example 6, in which the content ratio of the HFP monomer unit was 10.6% by mass but the molecular weight exceeded 350,000, resulted in poor adhesion to the electrode during dry heat pressing. Comparative Examples 4 and 5, in which the content of the filler was outside of the range of from 30% by mass to 80% by mass with respect to the total mass of the polyvinylidene fluoride type resin and the filler, made it difficult to achieve both adhesion to the electrode and thermal dimensional stability.

The disclosure of Japanese Patent Application No. 2015-133546 is hereby incorporated by reference in its entirety.

All publications, patent applications, and technical standards mentioned in this specification are herein incorporated by reference to the same extent as if each individual publication, patent application, and technical standard were specifically and individually indicated to be incorporated by reference.

The invention claimed is:

1. A separator for a non-aqueous secondary battery, comprising:
   a porous substrate; and
   a porous layer formed on one surface or both surfaces of the porous substrate and containing a polyvinylidene fluoride type resin and a filler, wherein:
   the filler is selected from the group consisting of metal hydroxides, metal oxides and metal sulfates,
   a content of the filler in the porous layer is from 30% by mass to 80% by mass with respect to a total mass of the polyvinylidene fluoride type resin and the filler,
   a thermal shrinkage ratio in a machine direction of the separator when heat-treated at 135° C. for 30 minutes is 20% or less, and
   the polyvinylidene fluoride type resin contains the following resin A or resin B:
   resin A: a copolymer containing a vinylidene fluoride monomer unit and a hexafluoropropylene monomer unit and having a weight average molecular weight of from 100,000 to 350,000, wherein a content of the hexafluoropropylene monomer unit is more than 5% by mass but not more than 10.0% by mass with respect to all monomer units of resin A;

resin B: a copolymer containing a vinylidene fluoride monomer unit and a hexafluoropropylene monomer unit and having a weight average molecular weight of from hexafluoropropylene monomer unit and having a weight average molecular weight of from 100,000 to 1,000,000, wherein a content of the hexafluoropropylene monomer unit is from 11.5% by mass to 15% by mass with respect to all monomer units of resin B.

2. The separator for a non-aqueous secondary battery according to claim 1, wherein a content of the filler in the porous layer is from 50% by mass to 70% by mass with respect to the total mass of the polyvinylidene fluoride type resin and the filler.

3. A non-aqueous secondary battery, comprising:
a positive electrode;
a negative electrode; and
the separator for a non-aqueous secondary battery according to claim 1 disposed between the positive electrode and the negative electrode,
wherein an electromotive force is obtained by doping and dedoping lithium.

4. A method of manufacturing a non-aqueous secondary battery comprising a positive electrode, a negative electrode, and the separator for a non-aqueous secondary battery according to claim 1 disposed between the positive electrode and the negative electrode, wherein an electromotive force is obtained by doping and dedoping lithium, the method comprising:
a process of disposing the separator for a non-aqueous secondary battery between the positive electrode and the negative electrode, and rolling the electrodes and the separator to form a stacked body;
a process of subjecting the stacked body to a heat pressing treatment under a temperature condition of 60° C. or higher but lower than 100° C. to form a battery element; and
a process of accommodating the battery element in an outer casing in a state in which the battery element is impregnated with an electrolyte solution.

5. The separator for a non-aqueous secondary battery according to claim 1, wherein the filler surface-modified with a silane coupling agent.

6. The separator for a non-aqueous secondary battery according to claim 1, wherein the filler is selected from plate-like particles and non-aggregated primary particles.

7. The separator for a non-aqueous secondary battery according to claim 1, wherein the porous layer has a large number of micropores inside, and has a structure in which these micropores are connected to each other.

8. The separator for a non-aqueous secondary battery according to claim 1, wherein the filler has a spherical shape, an elliptical shape, a rod-type shape, or an amorphous shape.

9. A separator for a non-aqueous secondary battery, comprising:
a porous substrate; and
a porous layer formed on one surface or both surfaces of the porous substrate and containing a polyvinylidene fluoride type resin and a filler, wherein:
the filler is selected from the group consisting of metal hydroxides, metal oxides and metal sulfates,
a content of the filler in the porous layer is from 30% by mass to 80% by mass with respect to a total mass of the polyvinylidene fluoride type resin and the filler,
a mass per layer area of the porous layer is from 0.5 g/m$^2$ to 5.0 g/m$^2$, and
the polyvinylidene fluoride type resin contains the following resin A or resin B:
resin A: a copolymer containing a vinylidene fluoride monomer unit and a hexafluoropropylene monomer unit and having a weight average molecular weight of from 100,000 to 350,000, wherein a content of the hexafluoropropylene monomer unit is more than 5% by mass but not more than 10.0% by mass with respect to all monomer units of resin A;
resin B: a copolymer containing a vinylidene fluoride monomer unit and a hexafluoropropylene monomer unit and having a weight average molecular weight of from 100,000 to 1,000,000, wherein a content of the hexafluoropropylene monomer unit is from 11.5% by mass to 15% by mass with respect to all monomer units of resin B.

10. The separator for a non-aqueous secondary battery according to claim 9, wherein a content of the filler in the porous layer is from 50% by mass to 70% by mass with respect to the total mass of the polyvinylidene fluoride type resin and the filler.

11. A non-aqueous secondary battery, comprising:
a positive electrode;
a negative electrode; and
the separator for a non-aqueous secondary battery according to claim 9 disposed between the positive electrode and the negative electrode,
wherein an electromotive force is obtained by doping and dedoping lithium.

12. A method of manufacturing a non-aqueous secondary battery comprising a positive electrode, a negative electrode, and the separator for a non-aqueous secondary battery according to claim 9 disposed between the positive electrode and the negative electrode, wherein an electromotive force is obtained by doping and dedoping lithium, the method comprising:
a process of disposing the separator for a non-aqueous secondary battery between the positive electrode and the negative electrode, and rolling the electrodes and the separator to form a stacked body;
a process of subjecting the stacked body to a heat pressing treatment under a temperature condition of 60° C. or higher but lower than 100° C. to form a battery element; and
a process of accommodating the battery element in an outer casing in a state in which the battery element is impregnated with an electrolyte solution.

13. The separator for a non-aqueous secondary battery according to claim 9, wherein the filler is surface-modified with a silane coupling agent.

14. The separator for a non-aqueous secondary battery according to claim 9, wherein the filler is selected from plate-like particles and non-aggregated primary particles.

15. The separator for a non-aqueous secondary battery according to claim 9, wherein the porous layer has a large number of micropores inside, and has a structure in which these micropores are connected to each other.

16. The separator for a non-aqueous secondary battery according to claim 9, wherein the filler has a spherical shape, an elliptical shape, a rod-type shape, or an amorphous shape.

* * * * *